(12) United States Patent
Bach

(10) Patent No.: US 10,295,738 B2
(45) Date of Patent: May 21, 2019

(54) ELECTRO-OPTICAL MODULATOR

(71) Applicant: FRAUNHOFER-GESELLSCHAFT ZUR FÖRDERUNG DER ANGEWANDTEN FORSCHUNG E.V., Munich (DE)

(72) Inventor: Heinz-Gunter Bach, Berlin (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 0 days.

(21) Appl. No.: 15/537,340

(22) PCT Filed: Dec. 21, 2015

(86) PCT No.: PCT/EP2015/080782
§ 371 (c)(1),
(2) Date: Jun. 16, 2017

(87) PCT Pub. No.: WO2016/097406
PCT Pub. Date: Jun. 23, 2016

(65) Prior Publication Data
US 2018/0003893 A1    Jan. 4, 2018

(30) Foreign Application Priority Data

Dec. 19, 2014  (DE) .................. 10 2014 119 195

(51) Int. Cl.
*G02B 6/12* (2006.01)
*G02F 1/01* (2006.01)
*G02F 1/225* (2006.01)

(52) U.S. Cl.
CPC .............. *G02B 6/12* (2013.01); *G02F 1/011* (2013.01); *G02F 1/0121* (2013.01);
(Continued)

(58) Field of Classification Search
None
See application file for complete search history.

(56) References Cited

U.S. PATENT DOCUMENTS 7,657,130 B2 * 2/2010 Shastri ................ G02F 1/0121
                                                        385/1
9,310,629 B2 * 4/2016 Patel ..................... G02B 6/132
(Continued)

FOREIGN PATENT DOCUMENTS

| EP | 2615490 A1 | 7/2013 |
| JP | 2004-151590 A | 5/2004 |
| WO | 2013/104715 A1 | 7/2013 |

OTHER PUBLICATIONS

Brast, T. et al. (2010). "Monolithic 100 Gb/s Twin-IQ Mach-Zehnder Modulators for Advanced Hybrid High-Capacity Transmitter Boards". IEEE. Optical Fiber Communication Conference and Exposition (OFC/NFOEC), 2011, and the National Fiber Optic Engineers Conference.
(Continued)

*Primary Examiner* — Tina M Wong
(74) *Attorney, Agent, or Firm* — Maschoff Brennan

(57) ABSTRACT

An electro-optical modulator is provided. The modulator comprises a first and a second optical waveguide, at least one first capacitance, via which a voltage can be applied to a light-guiding region of the first optical waveguide, at least one second capacitance, via which a voltage can be applied to a light-guiding region of the second optical waveguide, an electrically conductive region, via which the first and second capacitances are electrically connected to one another, and a feed line to the electrically conductive region, via which feed line a DC voltage can be applied to the electrically conductive region, wherein the feed line is constituted such that it represents an electrical resistance connected in parallel with the second capacitance, and a compensation
(Continued)

resistance connected in parallel with the first capacitance and serving for reducing transients in a voltage profile on the first and second capacitances during the operation of the modulator.

20 Claims, 11 Drawing Sheets

(52) U.S. Cl.
CPC .......... *G02F 1/2255* (2013.01); *G02F 1/2257* (2013.01); *G02B 2006/12142* (2013.01)

(56) References Cited

U.S. PATENT DOCUMENTS

| | | | | |
|---|---|---|---|---|
| 9,891,450 | B2* | 2/2018 | Baudot | G02F 1/025 |
| 2004/0208454 | A1* | 10/2004 | Montgomery | G02F 1/025 |
| | | | | 385/50 |
| 2005/0105848 | A1* | 5/2005 | Yamada | G02B 6/30 |
| | | | | 385/31 |
| 2005/0147351 | A1 | 7/2005 | Johnstone et al. | |
| 2009/0103850 | A1 | 4/2009 | Shastri et al. | |
| 2011/0211786 | A1* | 9/2011 | Ushida | G02F 1/025 |
| | | | | 385/2 |
| 2013/0064491 | A1* | 3/2013 | Fujikata | G02F 1/025 |
| | | | | 385/2 |
| 2014/0355926 | A1 | 12/2014 | Velthaus | |

OTHER PUBLICATIONS

Hoffmann, D. et al. (2004). "45 GHZ Bandwith Travelling Wave Electrode Mach-zehnder Modulator with Integrated Spot Size Converter". Proceedings International Conference on Indium Phosphide and Related Materials, 2004, p. 585-588.

Chen, H. (2007). "Development of an 80 Gbit/s InP-based Mach-Zehnder Modulator". Dissertation TU-Berlin 2007.

Klein, H. (2010). "Integrated InP Mach-Zehnder Modulators for 100 Gbit/s Ethernet Applications using QPSK Modulation". Dissertation TU-Berlin 2010.

Kato et al., "10-Gb/s-80-km operation of full C-band InP MZ modulator with linear-accelerator-type tiny in-line centipede electrode structure directly driven by logic IC of 90-nm CMOS process", IEEE Optical Fiber Communication Conference and Exposition (OFC/NFOEC) and the National Fiber Optic Engineers Conference, Mar. 2011, pp. 1.

Velthaus et al., "High performance InP-based Mach-Zehnder modulators for 10 to 100 Gb/s optical fiber transmission systems", 23rd International Conference on Indium Phosphide and Related Materials, IPRM 2011, May 2011, paper Th 9.2.1, pp. 1-4.

Walker, "High-Speed III-V Semiconductor Intensity Modulators", IEEE Journal of Quantum Electronics, vol. 27, Issue 3, Mar. 1991, pp. 654-667.

\* cited by examiner

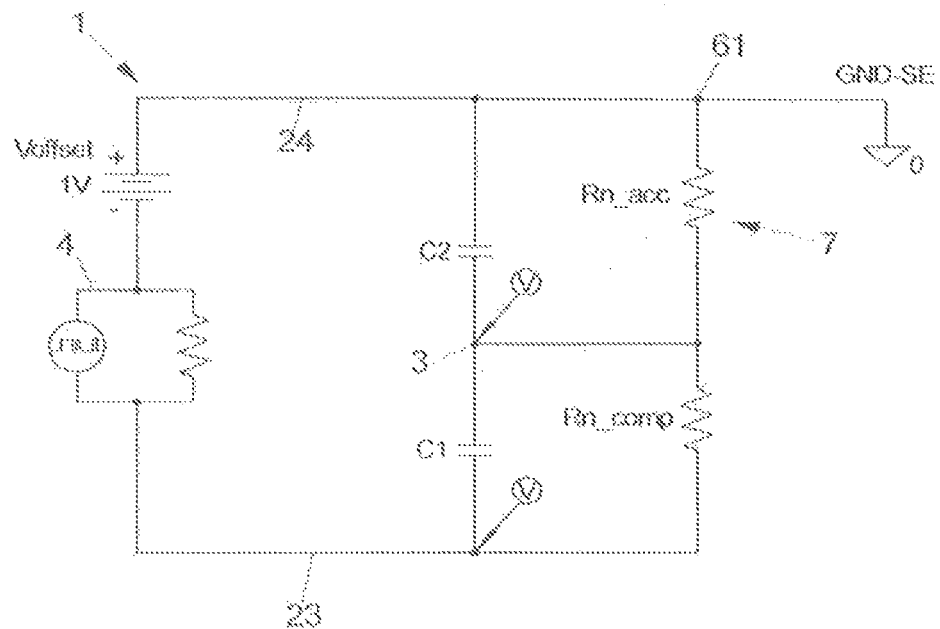
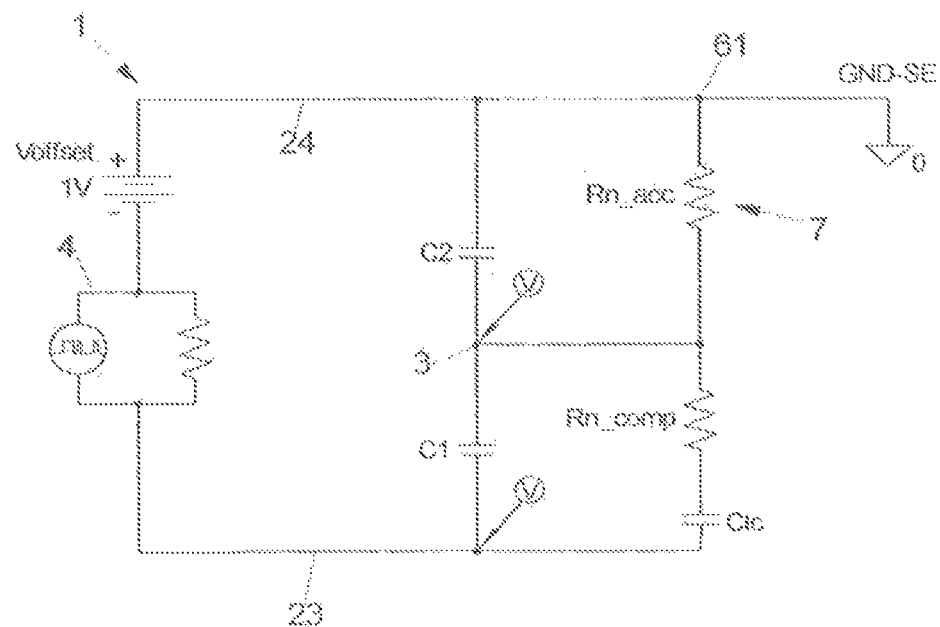

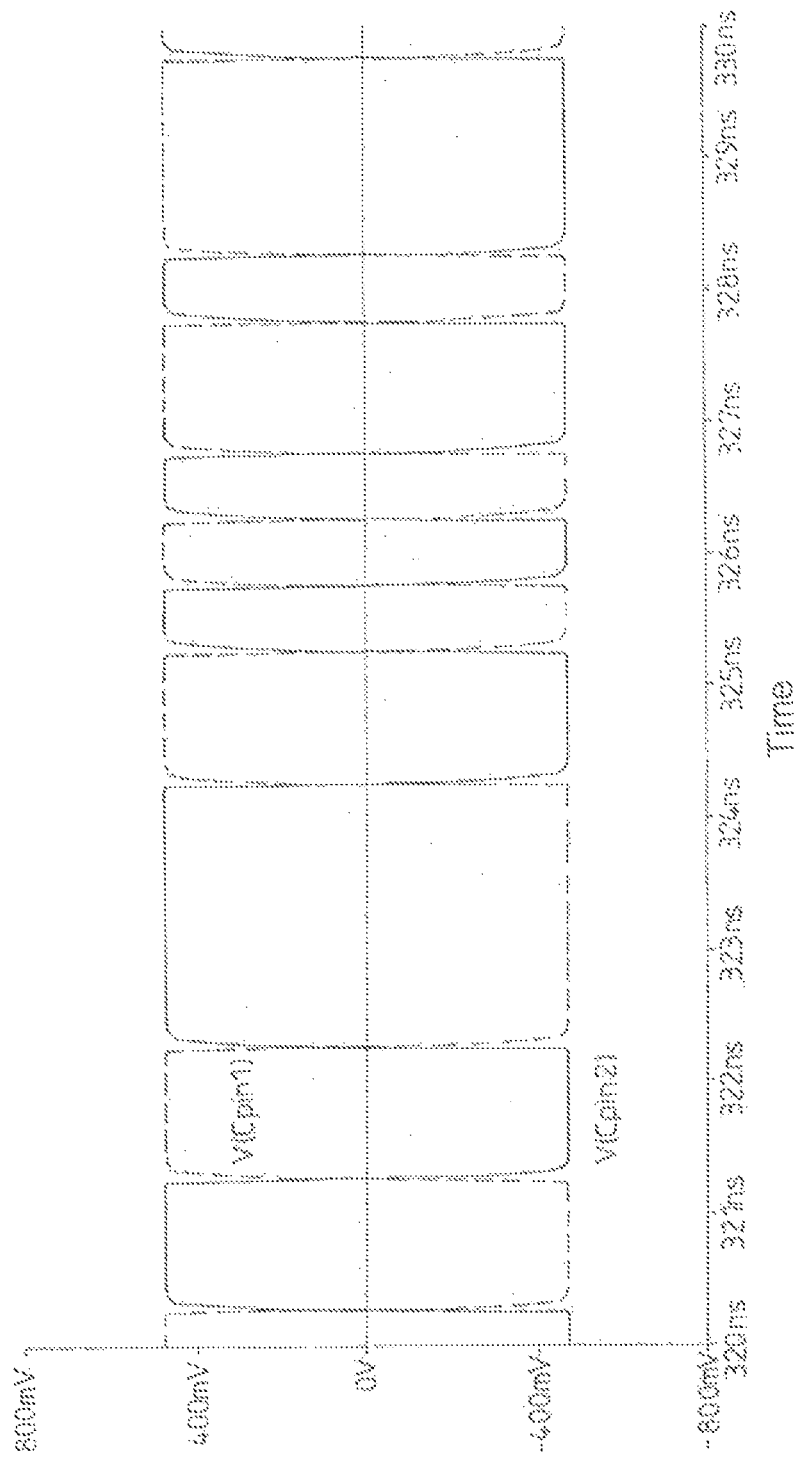

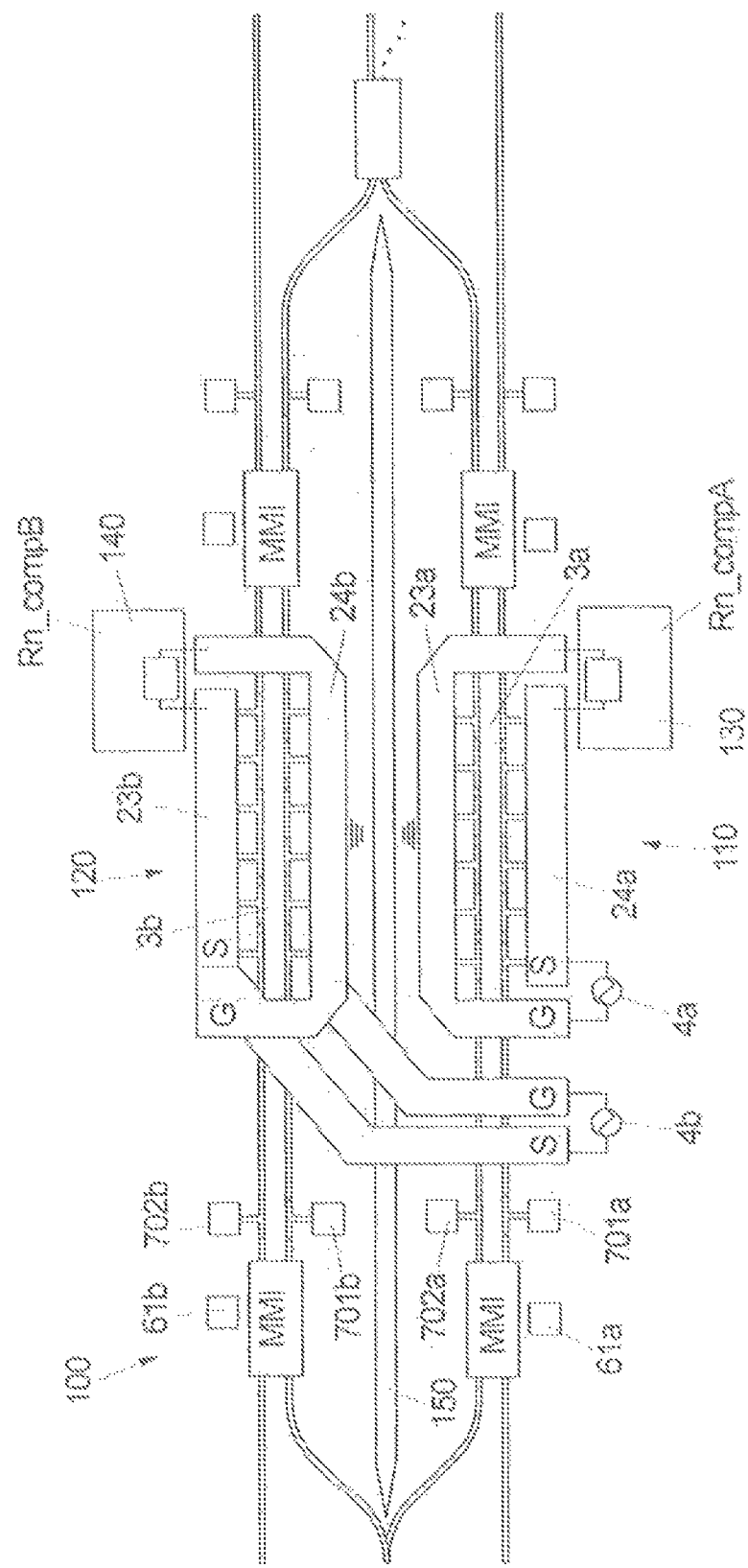

ELECTRO-OPTICAL MODULATOR

CROSS-REFERENCE TO A RELATED APPLICATION

This application is a National Phase Patent Application of International Patent Application Number PCT/EP2015/080782, filed on Dec. 21, 2015, which claims priority of German Patent Application Number 10 2014 119 195.1, filed on Dec. 19, 2014.

BACKGROUND

Electro-optical modulators (e.g. in the form of Mach-Zehnder modulators) are used in particular for high-bit-rate electro-optical light modulation, for instance for bit rates of between 10 and 100 Gbit/s. Known Mach-Zehnder modulators are often designed and operated according to the serial push-pull principle, as described e.g. in the publication "High-Speed III-V Semiconductor Intensity Modulators", R. G. Walker, IEEE J. Quantum Electronics Vol. 27, No. 3 (1991) 654-667. In particular, such modulators comprise capacitances to which an RF voltage can be applied via electrodes and which are coupled to one another via an electrically conductive region. The capacitances are respectively assigned to an optical waveguide of the modulator, wherein the RF voltage can act on the optical waveguides via the capacitances. In this way, the RF voltage can influence the phase of an optical wave guided into the waveguide.

A division of the RF voltage in equal halves, said division also being dynamically effective, is desirable for an entirely satisfactory function of the modulator (in particular in order to realize an amplitude modulation as far as possible without chirp of the optical phase), for which reason the capacitances assigned to the modulator electrodes are chosen in particular with identical magnitude. The RF voltage is fed in e.g. asymmetrically ("single-ended"), i.e. one of the electrodes is at ground potential, while the RF signal is fed into the other electrode. Furthermore, a DC voltage (bias voltage) is applied to the electrodes in order to be able to set an operating point of the modulator. The bias voltage is applied in particular via a feed line to the electrically conductive region via which the capacitances of the modulator are coupled to one another. One example of such a modulator is disclosed in the article "High performance InP-based Mach-Zehnder modulators for 10 to 100 Gb/s optical fiber transmission systems", K.-O. Velthaus et al., IPRM 2011, paper Th-9.2.1.

Upon a rectangular RF voltage being applied to the signal-carrying modulator electrode, the phase of an optical wave propagating in the optical waveguides of such asymmetrically operated modulators often has an undesirably slow, transient switching edge profile, which is attributed e.g. to charge reversal—causing lingering ringing on the RF voltage pulse edges—of the connected capacitances of the modulator and the feed line for feeding in the bias voltage. This transient phase profile is associated with chirp of the optical modulator signal, which can adversely affect the bandwidth of the modulator. In particular, optical chirp disturbs the operation of arrangements which comprise a plurality of interconnected modulators, e.g. so-called IQ modulators.

SUMMARY

The problem addressed by the present invention is to enable an electro-optical modulator to be operated with as little chirp as possible, in particular even with asymmetrical radio-frequency driving.

This problem is solved by means of an electro-optical modulator having features as described herein.

Accordingly, an electro-optical modulator is provided, comprising
a first and a second optical waveguide;
    at least one first capacitance, via which a voltage can be applied to a light-guiding region of the first optical waveguide;
    at least one second capacitance, via which a voltage can be applied to a light-guiding region of the second optical waveguide;
    an electrically conductive region, via which the first and second capacitances are connected to one another;
    a feed line to the electrically conductive region, via which feed line a DC voltage can be applied to the electrically conductive region, wherein the feed line is constituted such that it represents an electrical resistance connected in parallel with the second capacitance; and
    a compensation resistance connected in parallel with the first capacitance and serving for reducing transients in a voltage profile on the first and second capacitances during the operation of the modulator, wherein
    the compensation resistance is dependent on the first capacitance or, in the case of a plurality of first capacitances, on a first total capacitance C1tot, the resistance of the feed line and the second capacitance C2 or, in the case of a plurality of second capacitances, on a second total capacitance C2tot, wherein the product $Rn\_comp \cdot C1$ or the product $Rn\_comp \cdot C1tot$ lies in the interval $(Rn\_acc \cdot C2)+-20\%$ or $(Rn\_acc \cdot C2tot)+-20\%$.

The compensation resistance provides for as frequency-independent a division as possible of an AC voltage fed to the modulator (in particular of an RF voltage) between the first and second capacitances, as a result of which the transients in the temporal profile of the optical phase as described in the introduction are reduced or at least substantially eliminated.

It is pointed out that a plurality of first and/or second capacitances can be present, in particular in a manner arranged one behind another along the optical waveguides. The plurality of first capacitances are then interconnected with the plurality of second capacitances via the electrically conductive region. However, it is also conceivable for only a single capacitance to be assigned to each waveguide.

According to the invention, the compensation resistance Rn_comp (i.e. the value of the compensation resistance) is dependent on the first capacitance C1 or, in the case of a plurality of first capacitances, on a first total capacitance C1tot, the resistance Rn_acc of the feed line and the second capacitance C2 or, in the case of a plurality of second capacitances, on a second total capacitance C2tot, wherein the product $Rn\_comp \cdot C1$ or the product $Rn\_comp \cdot C1tot$ lies in the interval $(Rn\_acc \cdot C2)+-20\%$ or $(Rn\_acc \cdot C2tot)+-20\%$ or in the interval $(Rn\_acc \cdot C2)+-10\%$ or $(Rn\_acc \cdot C2tot)+-10\%$ or the product $Rn\_comp \cdot C1$ or $Rn\_comp \cdot C1tot$ at least substantially corresponds to the product $Rn\_acc \cdot C2$ or $Rn\_acc \cdot C2tot$.

It is also conceivable for the first and second capacitances to be at least substantially identical. Therefore, the compensation resistance can also be dependent only on the resistance Rn_acc of the feed line, wherein the compensation resistance lies in particular in the interval $R\_acc+-20\%$ or $R\_acc+-10\%$, or the compensation resistance (i.e. the value of the compensation resistance) at least substantially corresponds to the resistance (i.e. the value of the resistance) R_acc of the feed line.

The dimensioning of the size and the manner of connection of the compensation resistance can moreover also be influenced by a resistance of the electrically conductive region via which the first and second capacitances are connected to one another. However, it is also possible for this resistance to be negligible in comparison with the resistance of the feed line, such that the compensation resistance is merely chosen depending on the resistance of the feed line.

The feed line to the electrically conductive region runs for example between the electrically conductive region and a contact pad that can be connected to a DC voltage source. However, it is also conceivable for the feed line to extend from the electrically conductive region as far as a DC voltage source for generating the DC voltage (bias voltage).

In accordance with another configuration of the invention, a first electrode for contacting the first capacitance and a second electrode for contacting the second capacitance are provided, wherein the compensation resistance is in particular electrically connected firstly to the first electrode and secondly to the electrically conductive region.

The first electrode constitutes e.g. a signal electrode and the second electrode constitutes a ground electrode, that is to say the modulator is connected up in such a way that the second electrode is connected to ground, while the signal is fed into the first electrode. The modulator according to the invention is thus operated asymmetrically, in particular, wherein the first and second electrodes are embodied in particular as traveling wave electrodes. It is pointed out, however, that the invention is not restricted to traveling wave modulators, but rather can e.g. also be realized in other modulators (for instance modulators comprising "lumped" electrodes).

By way of example, the first capacitance is formed by a capacitive section of the first waveguide and the second capacitance is formed by a capacitive section of the second waveguide. In particular, the modulator comprises, as already mentioned, a plurality of first capacitances formed e.g. by a plurality of capacitive sections of the first waveguide, and also a plurality of second capacitances formed e.g. by a plurality of capacitive sections of the second waveguide, wherein the plurality of first capacitive sections and the plurality of second capacitive sections are contacted e.g. via the electrodes mentioned above.

The modulator is in particular a semiconductor component, wherein the electrically conductive region is formed e.g. by at least one n-doped or p-doped semiconductor layer and the capacitive sections of the waveguides are realized in the form of p-i-n diodes. One possible basic electrical and optical design from which the modulator according to the invention can be developed further is described in the publication already cited above "High performance InP-based Mach-Zehnder modulators for 10 to 100 Gb/s optical fiber transmission systems", K.-O. Velthaus et al., IPRM 2011, paper Th-9.2.1, to which reference is expressly made in this respect.

However, the invention is not restricted to this type of modulator. It is also conceivable, for example, to use a plurality of drivers that are respectively assigned to a capacitive section of the optical waveguides. Such an electrical design of the modulator is shown e.g. in the article "10 Gb/s-80-km operation of full C-band InP MZ modulator with linear-accelerator-type tiny in-line centipede electrode structure directly driven by logic IC of 90-nm CMOS process", T. Kato et al., Optical Fiber Communication Conference and Exposition, 2011, p. 1.

In accordance with a further configuration of the invention, the compensation resistance is formed by at least two series-connected resistance elements, wherein a capacitor is arranged for example in series with (e.g. physically between) the resistance elements. The use of at least two resistance elements (instead of a single resistance) as compensation resistance serves in particular to minimize a stray-capacitive loading of an electrode (e.g. in the form of the traveling wave electrodes mentioned above) connected to the first and/or second capacitance and also of the doped conductive region.

The compensation resistance and the feed line to the electrically conductive region are connected—as viewed along the direction of propagation of an optical wave coupled into the modulator—in particular in each case to the front section of the electrically conductive region, or the compensation resistance and the feed line to the electrically conductive region are connected in each case to a rear section of the electrically conductive region. Consequently, the compensation resistance and the feed line are connected in each case to the same side of the electrically conductive region, wherein the exact region of the front or rear section of the electrically conductive region to which they are respectively connected need not be identical, of course.

The "front section" of the electrically conductive region is considered to be, in particular, a region which faces a modulator input and which has e.g. an extent along the direction of propagation of the light guided in the modulator which is at least approximately half or one third of the extent of the (e.g. at least approximately rectangular) electrically conductive region along the direction of propagation of the light. Correspondingly, the "rear section" of the electrically conductive region can be considered to be a region which faces a modulator output and which has e.g. an extent along the direction of propagation of the light guided in the modulator (i.e. the longitudinal direction of the modulator) which is at least approximately half or one third of the extent of the electrically conductive region along the longitudinal direction of the modulator.

Furthermore, the compensation resistance can be connected to a front or rear end section—as viewed along the direction of propagation of an optical wave coupled into the modulator—of the first electrode. Analogously to the front and rear sections of the electrically conductive region, the "front" and "rear" end sections are respectively considered to be, in particular, a region of the first electrode which faces and respectively faces away from a modulator input and which has e.g. an extent along the longitudinal direction of the modulator which is at least approximately half or one third of the extent of the first electrode in this direction.

Furthermore, the feed line to the electrically conductive region can extend from a contact pad situated—as viewed along the direction of propagation of an optical wave coupled into the modulator—upstream of the first and second electrodes.

It is also conceivable for the electrically conductive region to be formed by a partial section of a doped semiconductor layer that is connected to a further partial section of the doped semiconductor layer, said further partial section shaping the electrically conductive region. In other words, both the feed line and the electrically conductive region are formed by the same semiconductor layer. The partial section that forms the feed line has e.g. a line-like, elongate form which extends to the (e.g. rectangular) further partial section of the doped semiconductor layer. It is also possible, of course, for the feed line to be formed not by the doped semiconductor layer, but rather in the form of a separate line, for instance in the form of a bonding wire.

Alternatively or additionally, the compensation resistance can be formed by a partial section of a doped semiconductor layer which forms a further partial section for connecting the electrically conductive region.

In accordance with a further configuration of the invention, the compensation resistance is monolithically integrated with other components of the modulator, that is to say that at least some components of the modulator and the compensation resistance are arranged on a common substrate. It is also conceivable that, in the abovementioned variant according to which the compensation resistance comprises at least two resistance elements, at least one of the resistance elements is concomitantly arranged on the modulator substrate. The capacitor—likewise already mentioned—between the resistance elements can in this case be arranged on a substrate separate from the modulator.

In another development of the invention, the modulator comprises a terminating resistance connected to the first and second electrodes, said terminating resistance being able to be situated on a different substrate than the first and second electrodes (i.e. the terminating resistance is not monolithically integrated with the optical and electrical basic structure of the modulator), wherein at least one of the resistance elements of the compensation resistance is concomitantly arranged on the substrate of the terminating resistance.

The invention also relates to a modulator arrangement, comprising at least one first and one second electro-optical modulator, wherein at least one of the two modulators is embodied as described above. By way of example, the modulator arrangement is an IQ modulator.

BRIEF DESCRIPTION OF THE DRAWINGS

The invention is explained in greater detail below on the basis of exemplary embodiments with reference to the figures.

FIG. 4 shows an equivalent circuit diagram of an electro-optical modulator in accordance with a first exemplary embodiment of the invention.

FIG. 5 shows an equivalent circuit diagram of an electro-optical modulator in accordance with a second exemplary embodiment of the invention.

FIG. 6A shows the temporal profile of the phase of an optical wave in the modulator from FIG. 4 with application of rectangular voltage changes to the electrodes of the modulator; wherein the modulated phase is substantially proportional to the field strengths or the voltage values in or across the p-i-n diodes.

FIG. 12 schematically shows a plan view of a modulator arrangement comprising two interconnected modulators according to the invention.

DETAILED DESCRIPTION

Figure 1:
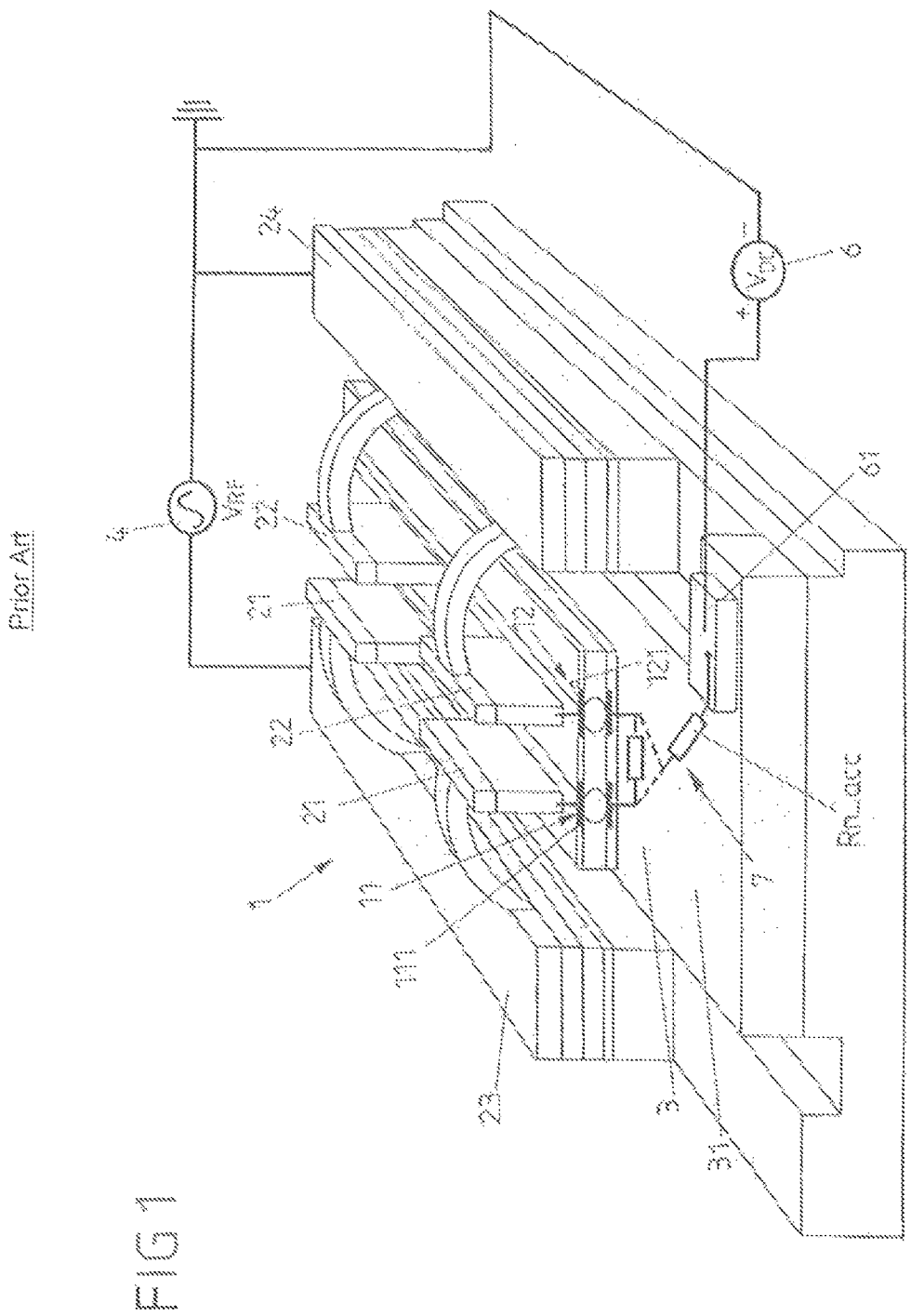
FIG. 1 schematically shows in a perspective illustration a conventional electro-optical Mach-Zehnder modulator.

FIG. 1 shows the basic design of a conventional Mach-Zehnder modulator 1 realized in the form of a semiconductor component. The Mach-Zehnder modulator 1 comprises a first and a second optical waveguide 11, 12, wherein capacitive sections 111, 121 of the waveguides 11, 12 form a plurality of capacitances, via each of which a voltage can be applied to a light-guiding region of the waveguides 11, 12 (in particular to a core of the waveguides 11, 12). The capacitive sections 111, 121 are formed in each case by p-i-n diode sections of the optical waveguides 11, 12 and are connected in antiseries with one another via a conductive region in the form of an n-doped region 3.

Furthermore, the modulator 1 comprises a plurality of waveguide electrodes 21, 22 respectively arranged on the capacitive sections 111, 121. The waveguide electrodes 21, 22 are connected via air bridges to a first and respectively a second electrode in the form of a first and respectively second coplanar line 23, 24, wherein the coplanar lines 23, 24 and the waveguide electrodes 21, 22 are embodied in the manner of a traveling wave line. Upon an RF voltage V being applied to the coplanar lines 23, 24 (via an RF voltage source 4), a first voltage +V/2 is dropped across the first capacitive sections 111, while a voltage −V/2 is dropped across the second capacitive sections 121 (serial "push-pull" operation known per se).

The p-i-n diodes of the capacitive sections 111, 121 are reverse-biased with the aid of a DC voltage source 6, wherein the DC voltage is applied between the n-doped region 3 and the second, grounded coplanar line 24. More precisely, the voltage source 6 is connected to a contact pad 61 ("DC pad"), which in turn makes contact with the n-doped region 3. In particular, the contact pad 61 is situated on a first section 31 of a semiconductor layer, which first section runs as far as a second section of the semiconductor layer, said second section forming the n-doped region 3. The contact pad 61 is situated outside a region delimited by the coplanar lines 23, 24.

The first section 31 thus forms a feed line 7, via which the DC voltage is applied to the n-doped region 3. The feed line 7 has a resistance Rn_acc attributed in particular to the layer structure of the modulator. Correspondingly, the feed line 7 represents a resistance Rn_acc which is connected in parallel with the second capacitive sections 121 and which is e.g. of the order of magnitude of 500 ohms. The n-doped region 3 forms a resistance Rn-contact between mutually opposite capacitive sections 111, 121, wherein e.g. Rn-contact as far as possible <1Ω holds true.

Figure 2:
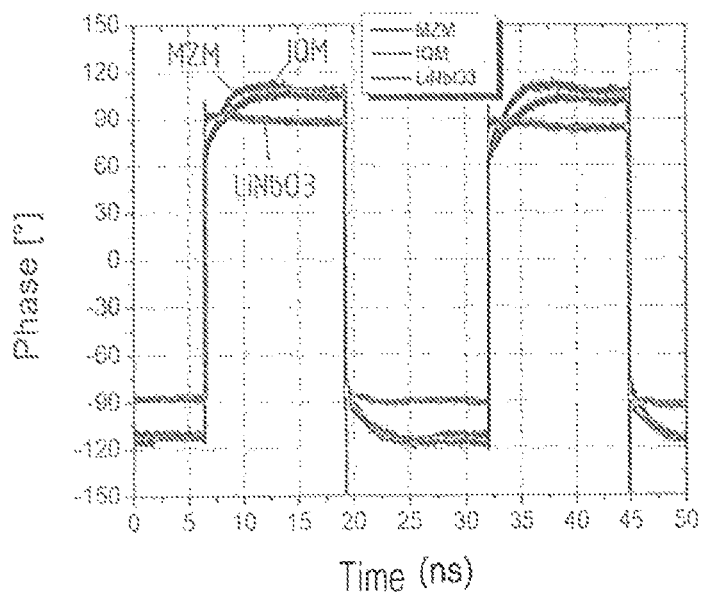
FIG. 2 shows the temporal profile of the phase of an optical wave after passing through various modulators with application of rectangular voltage changes to the electrodes of the modulators.

The modulator 1 illustrated in FIG. 1 is operated in single-ended ground-referenced fashion, i.e. asymmetrically, wherein an RF signal is applied to one of the coplanar lines 23, 24 (the line 23), while the other coplanar line 24 is grounded. It is also conceivable, of course, for the modulator to be connected up mirror-symmetrically with respect to FIG. 1, i.e. for the line 24 to be grounded. The asymmetrical operation of the modulator leads to slow transient compensation processes between the (anti) series-coupled p-i-n diodes of the capacitive sections 111, 121 and thus to phase drift processes (i.e. to an optical chirp), e.g. with time constants around 2 ns. The transient switching processes that occur are illustrated in FIG. 2, according to which, both in the case of a Mach-Zehnder modulator (curve "MZM" in FIG. 2) of the type shown in FIG. 1 (i.e. in the case of modulators based on a semiconductor such as e.g. InP) and in the case of an IQ Mach-Zehnder modulator (curve "IQM") based on modulators of the type shown in FIG. 1, the changes in the phase of a light wave fed into the modulator, said changes being brought about by the application of an RF voltage, have a distinctly transient profile, i.e. exhibit a transient response with a non-negligible time constant (for instance the 2 ns already mentioned). Modulators based on lithium niobate (curve "LiNbO3") usually exhibit a distinctly less transient profile.

One cause of the transient switching behavior can be seen in the charge reversal—taking place during each switching process—of the capacitances of the capacitive sections 111, 121 via the access resistance R_acc. The measured transient phase changes (FIG. 2) can be demonstrated with the aid of a simulation of the modulator switching behavior on the basis of the equivalent circuit diagram—shown in FIG. 3—of the modulator 1 from FIG. 1.

Figure 3:
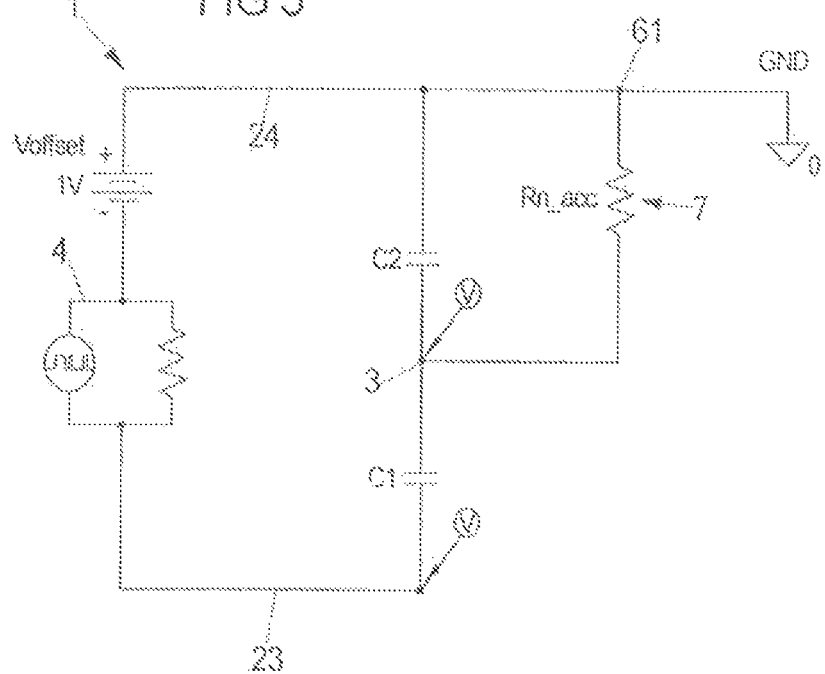
FIG. 3 shows an equivalent circuit diagram of a conventional electro-optical modulator with asymmetrical radio-frequency feeding.

The plurality of individual-diode pairs provided longitudinally according to the traveling wave principle (cf. FIG. 1, the p-i-n diodes of the capacitive sections 111, 121) are combined into two total capacitances C1 and C2 in the equivalent circuit diagram in FIG. 3. This is therefore justified in particular since the chirp time constant (~2 ns) under consideration here is very much longer than the passage time of the electrical traveling wave (~0.03 ns) through the modulator (through the coplanar lines 23, 24).

Furthermore, the equivalent circuit diagram in FIG. 3 simplifies the situation that the longitudinally distributed contact resistance (in the kΩ ohm range) of the (buried) n-doped region 3, which, in a modular construction of the modulator, is often contacted in parallel at the front and rear by means of two contact pads (cf. e.g. contact pad 61 in FIG. 1), was concomitantly taken into account in the external access resistance Rn_acc. It is pointed out that FIG. 3 (analogously to FIG. 4) is an RF small-signal equivalent circuit diagram, wherein the DC voltage source 6 from FIG. 1 is replaced by a short circuit.

FIG. 4 shows an equivalent circuit diagram of a modulator 1 in accordance with one exemplary embodiment of the invention. The construction of the modulator 1 corresponds to that in FIG. 3 (or FIG. 1). However, a compensation resistance Rn_comp is connected in parallel with the first capacitance C1. Said compensation resistance Rn_comp reduces or eliminates the abovementioned transients in a voltage profile on the first and second capacitances C1, C2 during the operation of the modulator, which can be proved with the aid of a simulation of the switching behavior of the modulator that is carried out on the basis of the equivalent circuit diagram from FIG. 4. A result of such a simulation is illustrated in FIG. 6A, which illustrates the voltage profile on one of the capacitances C1, C2 (y-axis) as a function of the applied RF signal (here PRBS sequences with a data rate of 2 Gbit/s). It can be discerned that the voltage profile follows the RF signal virtually without any transients.

The compensation of transients in the voltage profile by means of the compensation resistance is effected in particular by matching the time constants of the capacitance-resistance pairs C2, Rn_acc and C1, Rn_comp, i.e. by realizing the relationship:

$$C1 \times Rn\_comp = C2 \times Rn\_acc$$

It correspondingly holds true, if the capacitances C1 and C2 are identical, that the compensation resistance Rn_comp could be chosen to be equal to the feed line resistance Rn_acc.

Figure 6B:
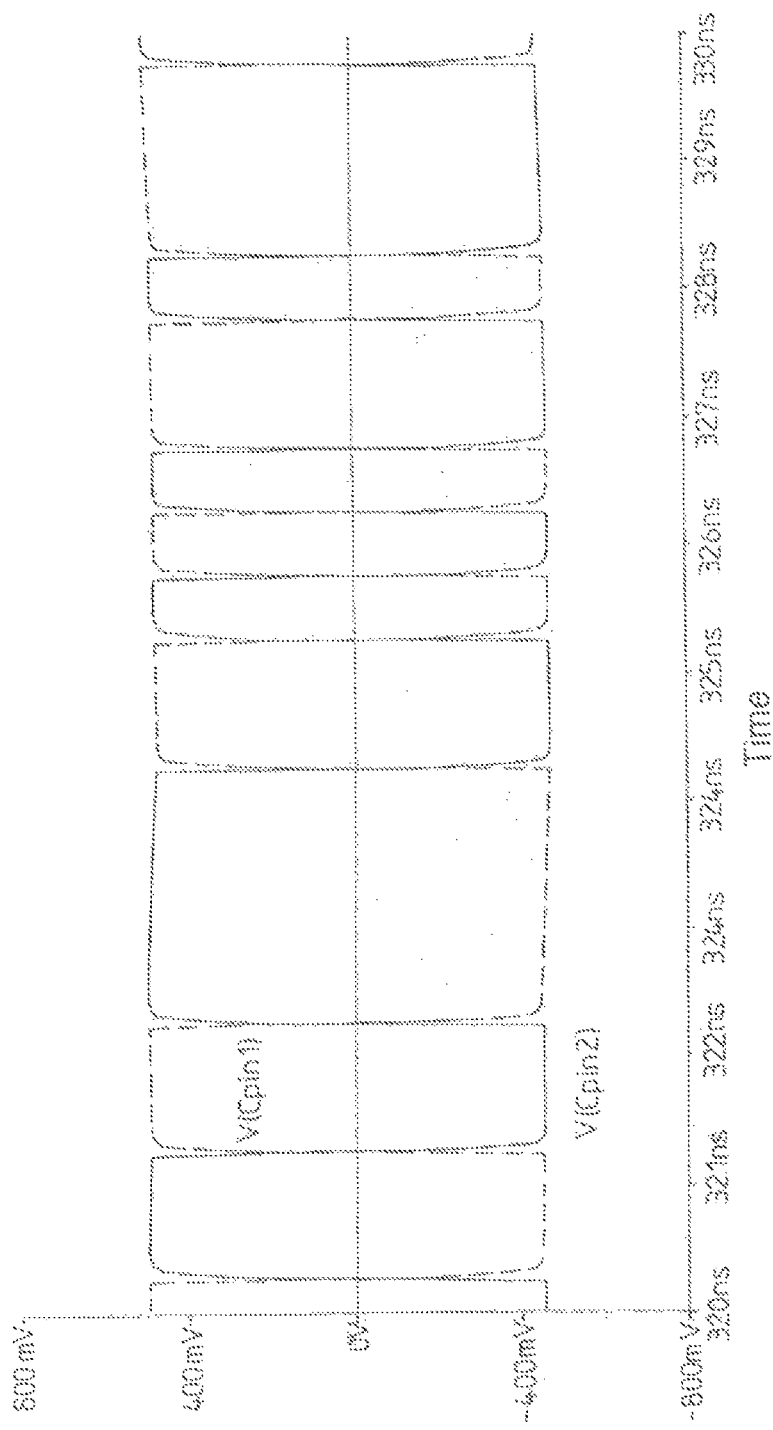
FIG. 6B shows the temporal profile of the phase in the modulator from FIG. 5 of an optical wave in the modulator from FIG. 5 with application of rectangular voltage changes.

Furthermore, a DC voltage blocking capacitor (bias blocking capacitor) can be provided; particularly in order to be able to feed the DC voltage (DC bias voltage) into the n-doped region 3 in a manner as free from shunt currents as possible (e.g. in order to enable a measurement of a photocurrent at a contact pad to the n-doped region 3 in a manner as free from interference as possible). A corresponding modification of FIG. 4 is illustrated in FIG. 5 (blocking capacitor Clc). A simulation of the voltage profile for the circuit in FIG. 5 analogously to FIG. 6A is shown in FIG. 6B, wherein 30 pF was used as capacitance for the blocking capacitor Clc.

It is pointed out that the equivalent circuit diagrams in FIGS. 4 and 5 can be regarded as a simplification of the traveling wave electrode construction of the modulator in FIG. 1, wherein the capacitances C1 and C2 represent total capacitances of the plurality of capacitances of the capacitive sections 111, 121. However, the invention indeed also encompasses modulators comprising continuous waveguide electrodes ("lumped electrodes"), wherein in each case only a single capacitance is assigned to the respective waveguide.

Figure 7:
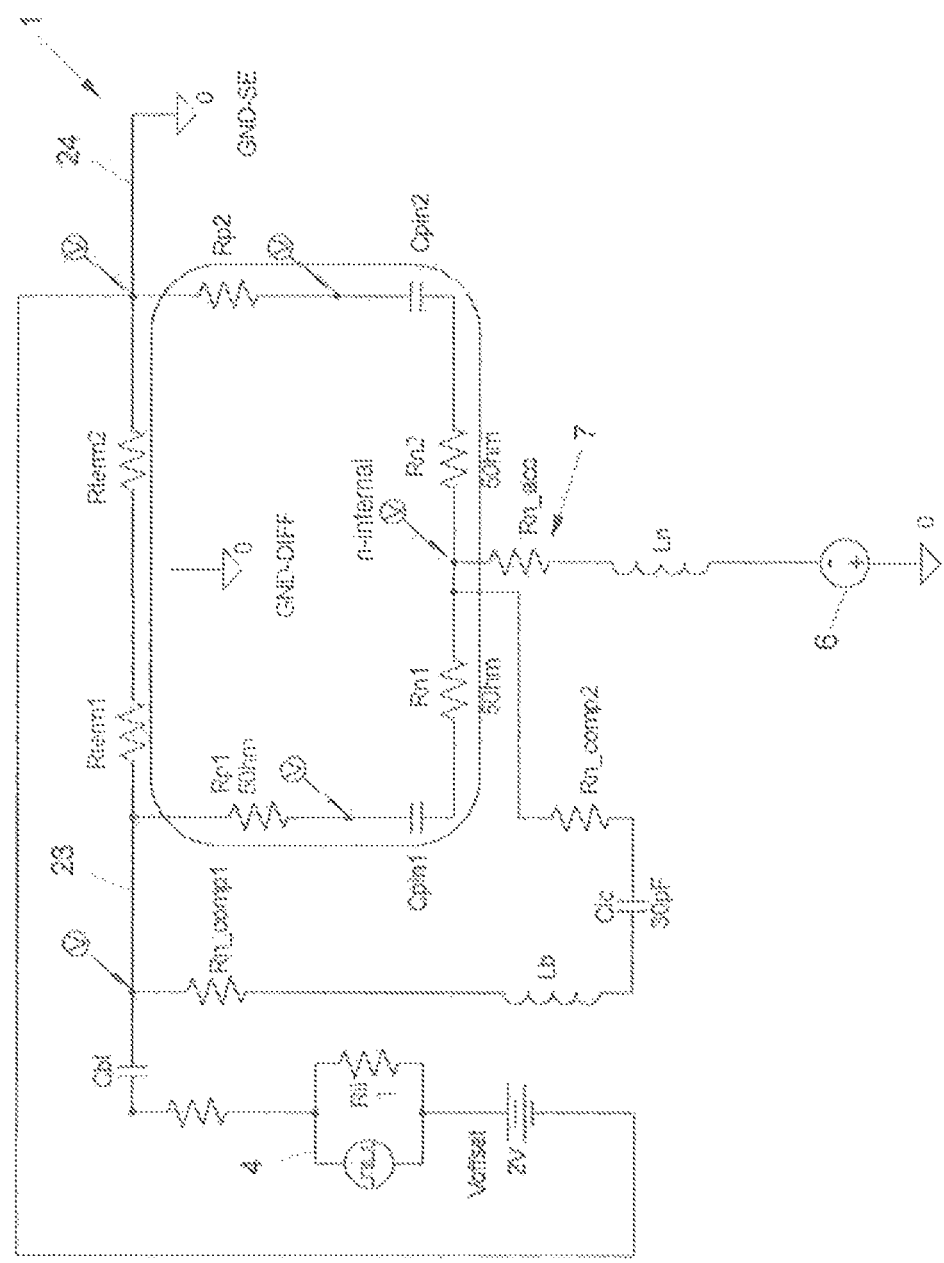
FIG. 7 shows an equivalent circuit diagram of an electro-optical modulator in accordance with a third exemplary embodiment of the invention.

FIG. 7 shows a modification of the equivalent circuit diagram in FIG. 5. The compensation resistance Rn_comp here is divided between two resistance elements Rn_comp1, Rn_comp2 (in particular of identical magnitude in terms of value). In particular a stray-capacitive loading of the signal line "to be tapped" (i.e. of the signal-carrying coplanar line 23 to which the compensation resistance is connected) and also of the common n-doped region 3 is thus intended to be minimized. As mentioned, the compensation resistance Rn_comp (i.e. the sum of the resistance elements Rn_comp1, Rn_comp2) is e.g. at least 500 ohms (i.e. ten times the customary line impedance of 50 ohms) and is thus negligible particularly in the sense of an Si' interference. It is conceivable, moreover, for the compensation resistance Rn_comp to be realized with as little stray capacitance as possible in an (in particular semi-insulating) substrate of the modulator.

In addition to the blocking capacitor Clc, a line and/or bond inductance Lb (e.g. 700 pH with a length of e.g. 1 mm) is provided in the compensation path formed by the resistance elements Rn_comp1, Rn_comp2 and the capacitor Clc. Furthermore, an inductance Ln is assigned to the feed line 7 and a further blocking capacitor Cbl is provided for protecting the RF voltage source 4.

FIG. 7 also illustrates the DC voltage source 6 (which supplies a voltage of e.g. 5 V in the reverse direction). Furthermore, resistances (e.g. in each case approximately 5 ohms) of p-type contact regions of the p-i-n diodes of the modulator 1 with the designations Rp1 and Rp2, partial resistances Rn1, Rn2 of the n-doped region 3 (cf. FIG. 1) and terminating resistances Rterm1, Rterm2 are shown. The terminating resistances Rterm1, Rterm2 (e.g. 2×25 ohms) can be grounded centrally or at one end, depending on the RF feeding-in to be examined. The n-doped region can be regarded at least approximately as an equipotential region in the longitudinal direction in comparison with the voltage drop across the external n-type region access resistance Rn_acc (e.g. supported by n-type region metal shunts extending in sections, or by selective epitaxy).

Possibilities for the concrete realization of the modulator illustrated in the equivalent circuit diagram in FIG. 7 (in particular of the compensation path formed by the resistance elements Rn_comp1, Rn_comp2 and the capacitor Clc) are described further below.

Furthermore, it is pointed out that the compensation path can be switched on or off via the value of the capacitance of the blocking capacitor Clc. By way of example, the capacitance can be chosen to be very small in order to switch off the compensation path, in particular in order to enable a symmetrical RF feeding-in (i.e. the differential operation of the modulator). Consequently, a single electrode layout can be used both for an asymmetrical RF feeding-in (i.e. one of the coplanar lines is at ground) and for the symmetrical RF feeding-in (none of the coplanar lines is permanently at ground).

A simulation of the switching behavior of the modulator (i.e. e.g. of a voltage across one of the capacitances C1, C2) yields an at least substantially transient-free profile in a manner similar to the simulation results of the circuits in FIGS. 4 and 5.

Figure 8:
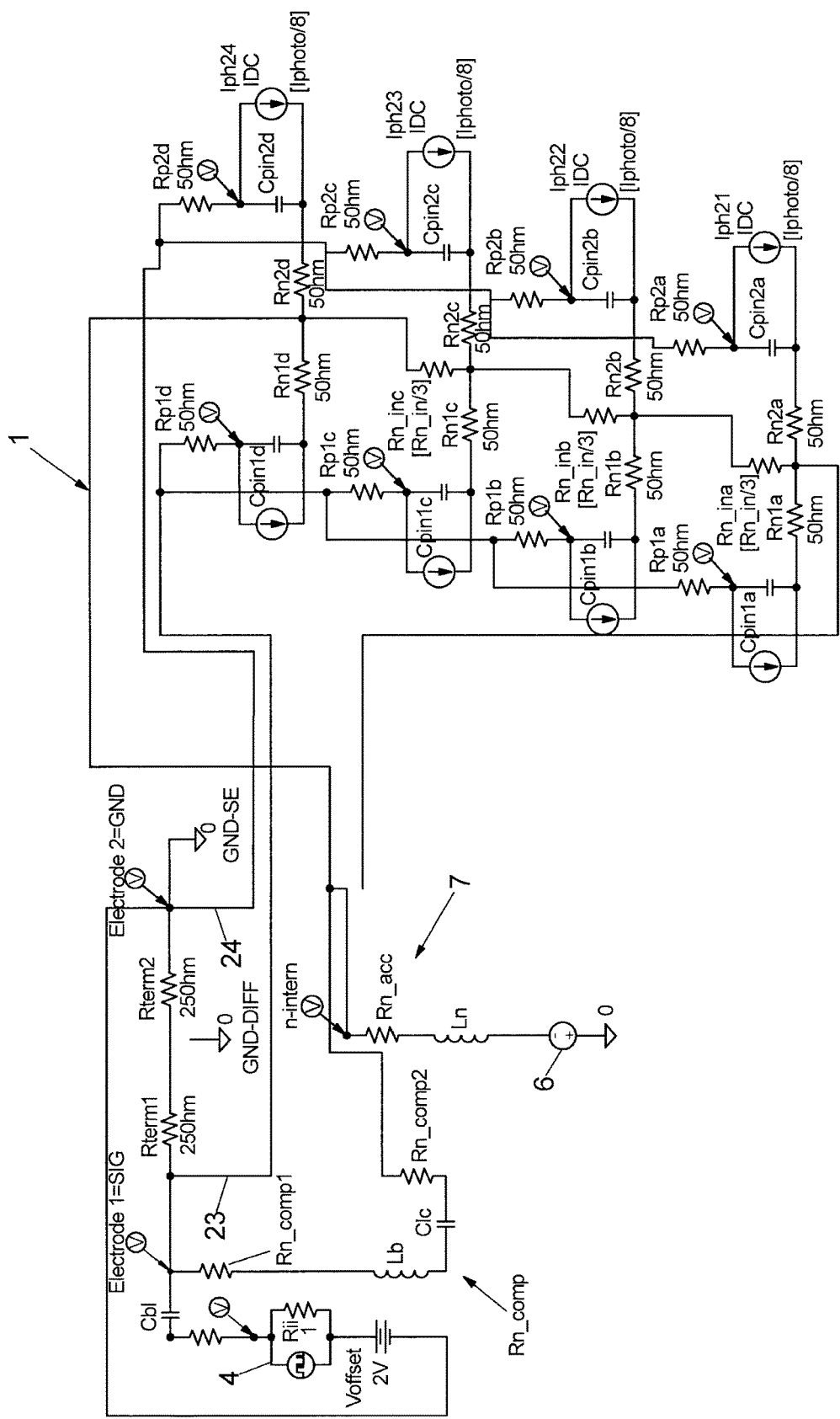
FIG. 8 shows an equivalent circuit diagram of an electro-optical modulator in accordance with a fourth exemplary embodiment of the invention.

FIG. 8 illustrates a further equivalent circuit diagram of a modulator 1 according to the invention, which in contrast to FIGS. 4, 5 and 7 contains, instead of the individual capacitances C1, C2, in each case a plurality of capacitances C1a-d (corresponding to the capacitances of the capacitive sections 111 of the modulator in FIG. 1) and C2a-d (corresponding to the capacitances of the capacitive sections 121). Correspondingly, a plurality of p-doped contact resistances Rp1a-d and Rp2a-d and a plurality of partial resistances Rn1a-d, Rn2a-d of the n-doped region 3 are also contained. For the rest, the equivalent circuit diagram corresponds to FIG. 7. It is also pointed out that although the modulator 1 shown in FIG. 8 comprises four diode pairs, it goes without saying that the invention also covers modulators comprising more or fewer diode pairs.

In accordance with FIG. 8, both the resistance elements Rn_comp1, Rn_comp2 of the compensation resistance and the feed line 7 are connected on the termination side, that is to say that both the compensation resistance and the feed line 7 are connected to a rear section of the n-doped region 3, i.e. to a section which extends in the region of a rear end of the coplanar lines 23, 24, which is respectively connected to a terminating resistance Rterm1, Rterm2 and is correspondingly situated—as viewed along the direction of propagation of an optical wave coupled into the modulator 1—behind a front end of the coplanar lines 23, 24, via which the RF signal is fed into the modulator 1.

Figure 11:
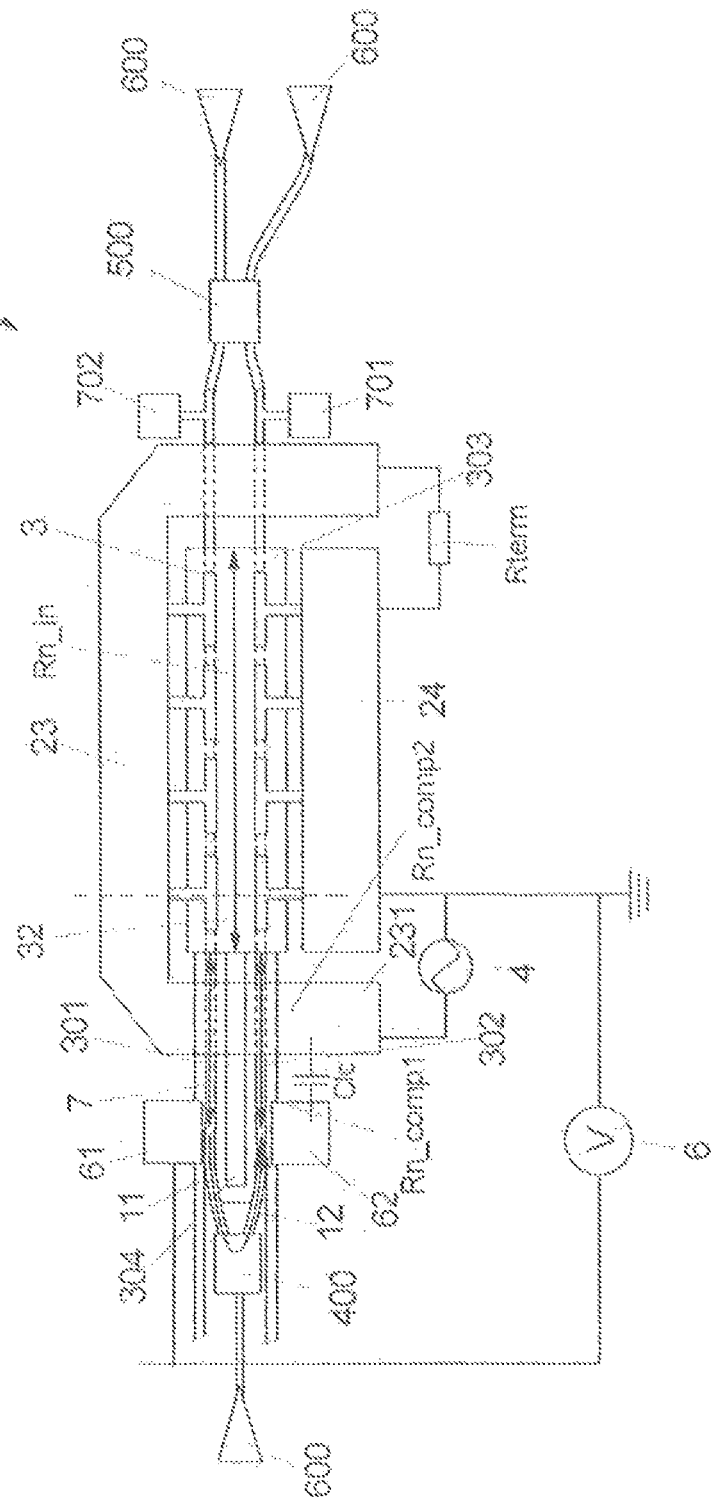
FIG. 11 schematically shows a plan view of an electro-optical modulator in accordance with a further exemplary embodiment of the invention.

It is also conceivable, of course, for both the feed line 7 (with the access resistance Rn_acc) and the compensation resistance with the resistance elements Rn_comp1, Rn_comp2 to be connected to the n-doped region 3 on the front side, i.e. to be connected in each case to a front section of the n-doped region 3 (cf. FIG. 11). It is additionally possible for the feed line 7 to be connected to the n-doped region 3 on the front side, and the compensation resistance on the termination side. Conversely, the feed line 7 could also be connected to the n-doped region 3 on the termination side, and the compensation resistance on the front side.

In accordance with FIG. 8, a longitudinal (along the direction of propagation of an electrical or optical wave in the modulator) resistance Rn_in (discretized into three partial bulk resistances Rn_in/3) of the n-doped region is also taken into account. The external access resistance Rn_acc to the n-doped region can be estimated e.g. at 200 ohms. This is a value which allows non-critical dimensioning with a compensation resistance Rn_comp of identical magnitude with respect to 25 ohms (half the terminating resistance) with regard to the additional electrode loading with the aim of still acceptable $S_{11}$ reflection. The total n-type region contact resistance Rn_in can be estimated e.g. at 1000 ohms.

A simulation on the basis of the equivalent circuit diagram illustrated in FIG. 8 yields in turn a low-transient voltage profile and thus suppression or avoidance of optical chirp. It is thus possible to achieve chirp suppression even when there is only limited good conductivity of the n-doped region, without addressing the individual p-i-n diodes (i.e. the respective capacitive sections 111, 121) of the modulator with the compensation measures (i.e. with the compensation resistance Rn_comp), that is to say without intervention in the (pre-optimized) electrode structure (in particular in the form of an internal traveling wave structure) of the active modulator part. Furthermore, the chirp compensation in the modulator according to the invention is freely adjustable in principle down to a lower cut-off limit in particular by means of a corresponding choice of the capacitance of the blocking capacitor Clc.

Figure 9:
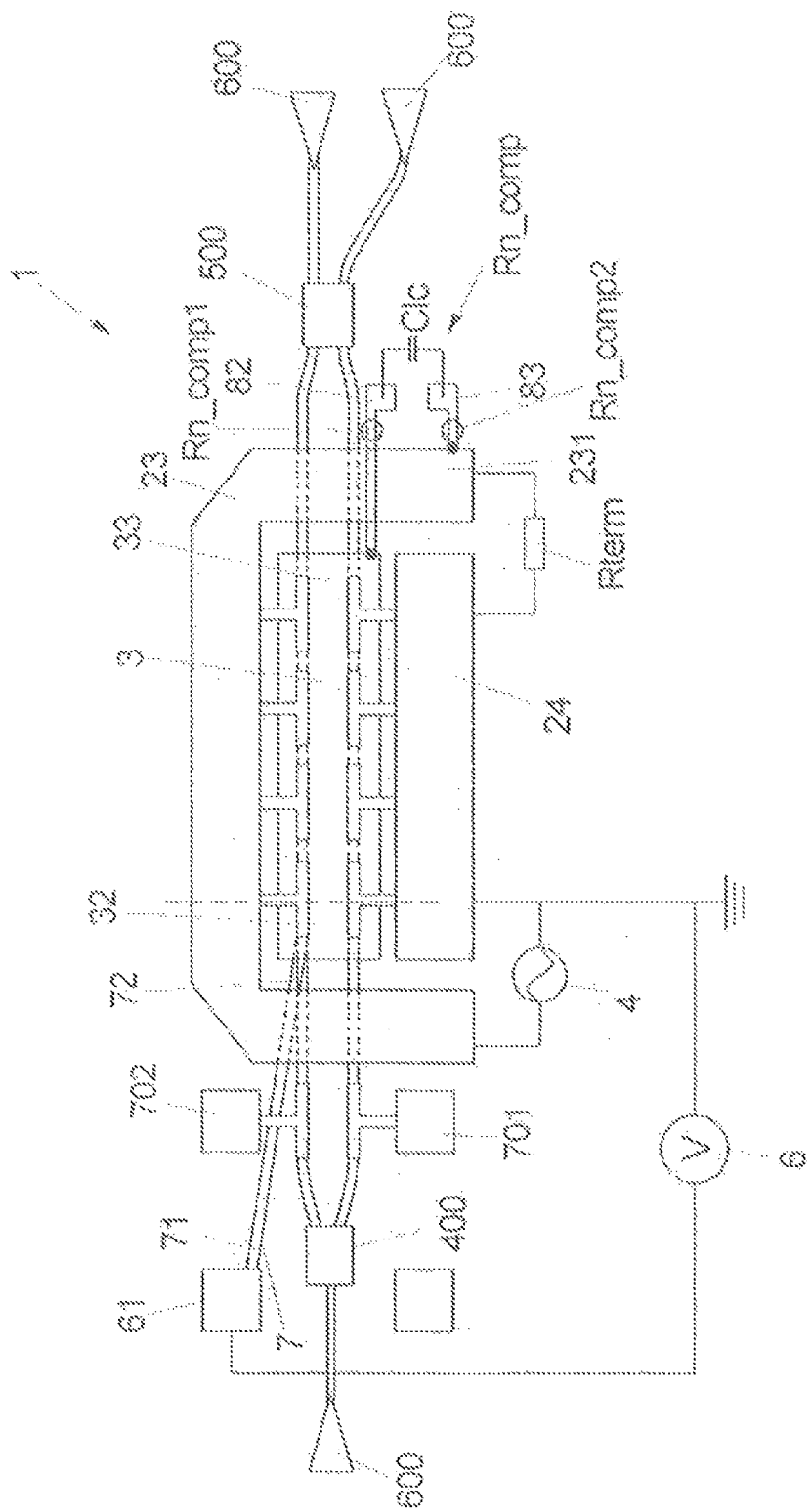
FIG. 9 schematically shows a plan view of an electro-optical modulator according to a fifth exemplary embodiment of the invention.

FIG. 9 shows one possible realization of a modulator with compensation resistance Rn_comp connected on the termination side and DC voltage (the "DC bias voltage") connected on the front side. Accordingly, the DC bias voltage is applied via a contact pad 61 situated—as viewed along the direction of propagation of the electrical waves 4 fed into the modulator 1 via the RF voltage source 4—upstream of the coplanar lines 23, 24 of the modulator 1.

The feed line 7 extends from the contact pad 61 to the n-doped region 3, wherein one end 71 of the feed line is connected to the contact pad 61 and the other end 72 is connected to the n-doped region 3. The end 72 is connected to a front section 32 of the n-doped region 3, said front section facing the contact pad 61. However, it is also conceivable for the end 72 to be connected to the front section 32 of the n-doped region 3 at a different point, e.g. to a side of the n-doped region 3 that faces away from the (bottom) electrode 24. As already mentioned above, the feed line 7 is embodied in particular as a section of an n-doped semiconductor layer which, with another section, forms the n-doped region 3.

It is also conceivable that after the transfer of the phase electrodes 701, 702 to the modulator output waveguides and with the replacement of the front p-i-n diodes assigned to the electrodes 701 and/or 702 shown here by somewhat widened ohmic contacts laterally with respect to the waveguides, the feed line to the n-doped region 3 is now implemented via the old contact pads 701 or 702 by means of the mesa substructure of the optical waveguides present; see also FIG. 1.

The resistance elements Rn_comp1, Rn_comp2 of the compensation resistance Rn_comp are arranged on a side of the coplanar lines 23, 24 that faces away from the contact pad 61. More precisely, one resistance element Rn_comp1 is connected to a rear section 33 of the n-doped region 3, while the other resistance element Rn_comp2 is connected to a rear section 231 of the coplanar line 23 (i.e. the signal electrode that is not grounded). The rear section 231 of the coplanar line 23 extends in particular at least approximately transversely with respect to the optical waveguides 11, 12 of the modulator 1 and is situated behind the other coplanar line 24 (which is grounded in "single-ended" operation). The blocking capacitor Clc already described above is situated between the resistance elements Rn_comp1, Rn_comp2.

The blocking capacitor Clc is connected to the resistance elements Rn_comp1, Rn_comp2 in particular via further contact pads 82, 83.

The rest of the optical and electrical construction of the modulator can be implemented in a manner known per se. In this regard, it is possible to use MMIs 400, 500 as input and respectively output couplers and optical mode transformers ("spot size converter") 600. Furthermore, it is possible to provide phase electrodes 701, 702 on the optical waveguides 11, 12, which serve to be able to set a phase offset independently of one another for the two optical waveguides 11, 12. The phase electrodes 701, 702 need not necessarily be arranged in front of the coplanar lines 23, 24, but rather may indeed also be situated behind the coplanar lines 23, 24.

In addition, attention is drawn to the following: for the best possible chirp compensation (i.e. operation as free from transients as possible), as already discussed above, the compensation resistance Rn_comp should correspond at least approximately to the resistance Rn_acc of the feed line. The resistance Rn_in of the n-doped region 3, which resistance has likewise already been discussed above, in this case does not necessarily influence the dimensioning of the compensation resistance Rn_comp.

Dimensioning of the feed line resistance Rn_acc and of the compensation resistance Rn_comp:

Since the sum of the compensation resistance Rn_comp and the access resistance Rn_acc in terms of RF engineering is in parallel with the RF voltage source 4 and thus practically also with the entire terminating resistance Rterm (e.g. 50 ohms) (cf. e.g. also FIG. 5), with the aim of the least possible S11 reflection (in particular at least −20 dB) Rn_comp=Rn_acc≥5×Rterm could be chosen, that is to say that given a terminating resistance of 2×25 ohms=50 ohms, it would be the case that Rn_comp=Rn_acc≥250 ohms, which leads to an S11 of less than −25 dB. At the same time, the slightly increased RF power consumption (≤10%) associated therewith is negligible. An upper limit for Rn_acc may be given by a photocurrent-governed additional voltage drop dependent on Rn_acc.

Influence of the contact resistance Rn_in of the n-doped region in relation to the feed line resistance Rn_acc:

Even if the internal (longitudinal) contact resistance Rn_in of the n-type region 3 does not directly influence the compensation formula, low-chirp operation would be possible even for Rn_acc>>Rn_in (e.g. Rn_in=1000 ohms leads to Rn_acc>10 000 ohms). The limit for this is determined in particular by the additional voltage drop across Rn_acc on account of the photocurrent Iphoto to be carried away, which then shifted the DC operating point of the n-type region 3 by Iphoto×Rn_acc (e.g. 1 mA×10 000 ohms=10 V) relative to the external DC voltage source and thus made the DC voltage operating point, which determines the phase relationships of the modulator, greatly dependent on the photocurrent.

Connection of the feed line resistance Rn_comp for the case Rn_acc≥10×Rn_in:

If technologically by means of suitable measures it is possible to achieve an extremely low-value n-type region contact resistance Rn_in in relation to Rn_acc (e.g. Rn_acc≥10×Rn_in), then in principle it is possible to choose freely whether the compensation resistance Rn_comp and the access resistance Rn_acc with respect to the n-type region 3 (of the active modulator part) are both connected on the same side of the n-type region 3 or are connected on mutually opposite sides of the n-type region 3, as illustrated in FIG. 9.

The "tapping" of the signal electrode (i.e. of the coplanar line 23) at its rear ("colder") end 231 can contribute to minimizing interference affecting the traveling wave operation of the modulator 1 and emission effects. In this case, as already explained above, dividing the compensation resistance Rn_comp into at least two partial resistances Rn_comp1, Rn_comp2 is helpful. In this regard, the respective stray-capacitive loading of the tapped electrode 23 and of the n-doped region 3 is minimized. Even a stray capacitance with which the partial resistances Rn_comp1, Rn_comp2 may be embedded into the substrate (e.g. in the form of a semi-insulating indium phosphide substrate) could be minimized in this way.

As mentioned, the following is intended to hold true, in particular: Rn_comp1+Rn_comp2=Rn_acc. Furthermore, the resistance elements Rn_comp1, Rn_comp2 can be monolithically integrated with other modulator components. By way of example, e.g. at least parts of the resistance elements Rn_comp1 and/or Rn_comp2 can be monolithically integrated, e.g. embodied using NiCr technology (particularly if this technology is already used for the monolithic integration of the terminating resistance).

The serial blocking capacitor Clc prevents a photocurrent bypass to the signal electrode (coplanar line 23) since the photocurrent is intended furthermore to be measured without interference solely via the contact pad 61. This may be significant if the n-doped region 3 is put at a comparatively high DC voltage in the region of 5 V relative to the coplanar line 23. The blocking capacitor Clc can be realized in various ways, which will also be discussed further below.

Besides the monolithic integration of the resistance elements Rn_comp1, Rn_comp2, e.g. the blocking capacitor Clc can also be monolithically integrated; for example "on-chip", i.e. on the same substrate as the optical waveguides 11, 12 and the coplanar lines 23, 24, for instance as an SiNx MIM capacitor. Depending on the available capacitance per unit area (e.g. approximately 600 pF/mm$^2$), the value of the blocking capacitor Clc is then upwardly limited, e.g. capacitances of more than 30 pF being chosen. By way of example, the blocking capacitor is embodied using "Multilayer MIM (metal-insulator-metal)" technology.

A monolithic integration of the complete compensation path (i.e. of the resistance elements Rn_comp1, Rn_comp2 and of the blocking capacitor Clc) without accesses via further series-connected bond pads would have the consequence, however, that the compensation path would not be "interruptible" and would thus always be active. A differential feeding of the RF voltage into the coplanar lines 23, 24 would therefore not be possible, rather only asymmetrical operation.

The blocking capacitor Clc may therefore also be embodied as a separate component that is connected "off-chip" (i.e. separately from a substrate on which e.g. the coplanar lines 23, 24 are arranged) and e.g. via bonding wires to the resistance elements Rn_comp1, Rn_comp2. By way of example, the blocking capacitor Clc is embodied in the form of a miniaturized SMD-type-like chip capacitor. The embodiment of the blocking capacitor Clc as a separate element also enables a differential (symmetrical) RF feeding-in by disconnection of the blocking capacitor Clc. The, in particular high-value, resistance elements Rn_comp1, Rn_comp2 integrated e.g. in each case on-chip, i.e. monolithically, would then have no further function.

A separate blocking capacitor Clc moreover e.g. also allows larger capacitance values, such that the lower operating frequency limit $f_{lc}$ of the compensation branch can be correspondingly reduced, wherein it holds true that:

$$f_{lc} \approx 1/(2\pi \cdot Rn\_comp \cdot Clc).$$

Figure 10:
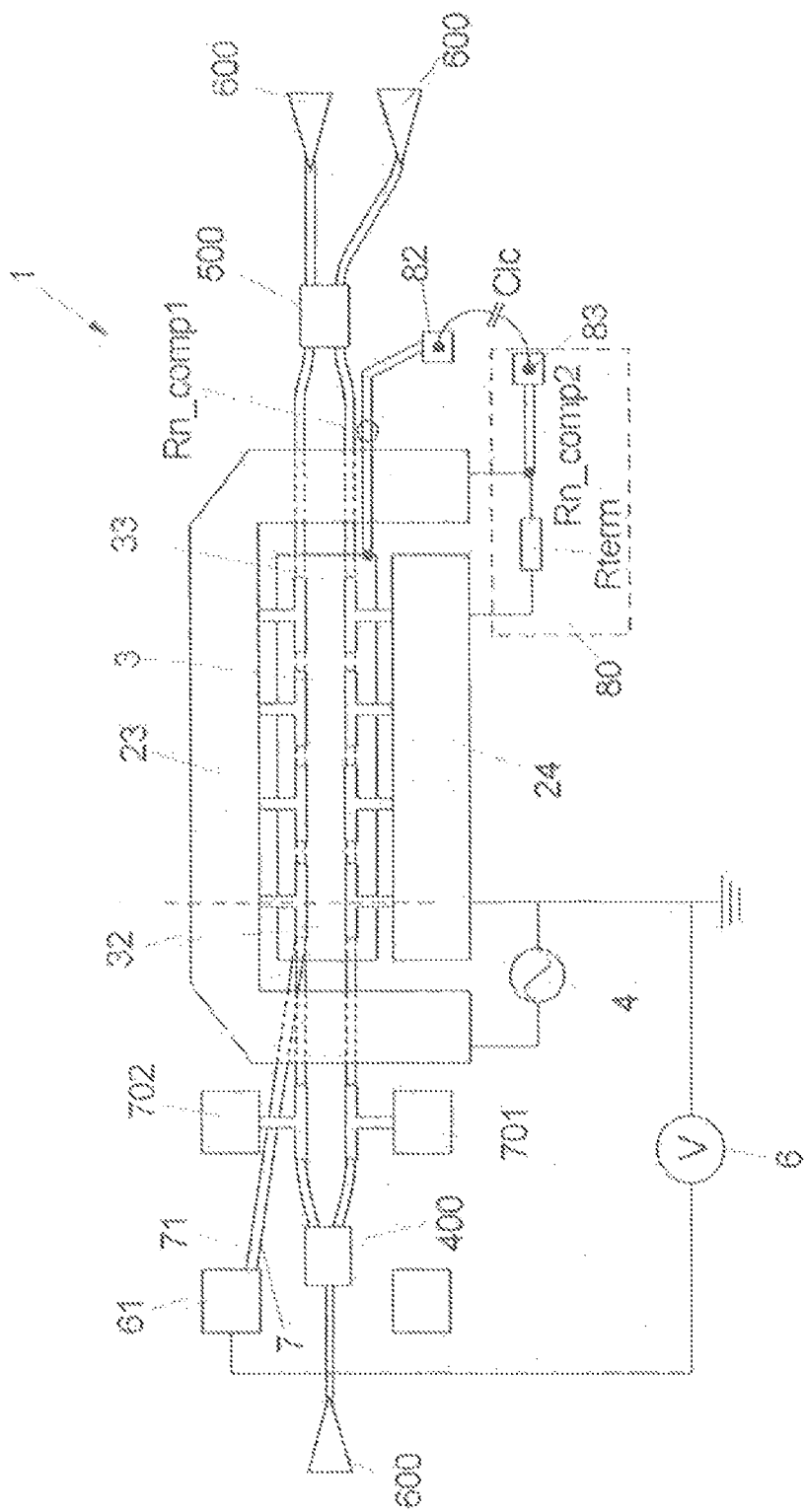
FIG. 10 shows a modification of the modulator from FIG. 9.

In addition, it is conceivable that, in the case of a separate blocking capacitor Clc, at least one of the two resistance elements Rn_comp1, Rn_comp2 (e.g. the resistance element Rn_comp2) is integrated for instance concomitantly into a separate ("off-chip") terminating resistance chip 80 (e.g. with 2×25 ohms), as is shown in FIG. 10.

A separate connection element ("bond pad") that otherwise connects the resistance element Rn_comp2 to the coplanar line 23 can then be omitted. It is possible, in particular, for one resistance element Rn_comp2 indeed to be arranged separately (e.g. as mentioned on the chip of the terminating resistance), but for the other resistance element Rn_comp1 to be monolithically integrated. The resistance element Rn_comp1 is connected to a contact pad 82 (bond pad) of the modulator 1, wherein the contact pad 82 is in turn connected to the blocking capacitor Clc. The blocking capacitor Clc, finally, is connected to a contact pad 83 of the terminating resistance chip 80.

However, the blocking capacitor Clc need not, of course, be embodied together with the terminating resistance chip 80 (at least not completely). Rather, it is also conceivable for said blocking capacitor to be embodied as a dedicated component. By way of example, only a part of the blocking capacitor Clc is concomitantly integrated into the terminating resistance chip 80. It is likewise conceivable for the blocking capacitor Clc to be arranged solely e.g. as an SMD ("surface mount design") capacitor between the bond pad 83 on the terminating resistance chip 80 and the bond pad 82 and to be connected to said bond pads 82, 83.

Particularly for the case where Rn_acc=Rn_comp≤Rn_in holds true (which may occur e.g. for rather uniform semiconductor layer sequences for the n-type region 3), the compensation path can advantageously be connected on the same side of the n-doped region 3 as the DC voltage feed 7. However, variants of the connection on the same side at the front section of the n-doped region 3 and/or at the rear section—facing the terminating resistance—of the n-doped region 3 are possible in this case.

Furthermore, the modulator can be fashioned such that the feed line 7 is electrically isolated from a connection of the compensation resistance Rn_comp to the signal coplanar line 23. This variant of the modulator according to the invention is illustrated in FIG. 11. Here, both the feed line 7 and the resistance element Rn_comp1 of the compensation resistance Rn_comp are embodied as sections 301, 302 of an n-doped semiconductor layer which, with a further section 303, also shapes the n-doped region 3.

In this case, the section 301 of the semiconductor layer that forms the feed line 7 extends from the contact pad 61 as far as the n-doped region 3. The section 302 of the semiconductor layer that shapes the resistance element Rn_comp1 runs between a further contact pad 62, which, like the contact pad 61, is connected to the n-doped semiconductor layer (e.g. is arranged on the latter), and the n-doped region 3. A partial section 231 of the signal coplanar line 23 realizes the resistance element Rn_comp2, which is connected to the further contact pad 62 via the blocking capacitor Clc. The resistance elements Rn_comp1 and Rn_comp2 are not necessarily equal in magnitude. In this regard, the resistance element Rn_comp2 formed by the partial section 231 of the signal coplanar line 23 may make up e.g. only approximately 10% of the total compensation resistance (the section 302, i.e. the resistance element Rn_comp1, correspondingly realizes 90% of the total compensation resistance). Some other division is also conceivable, of course. It is also possible, moreover, for both resistance elements Rn_comp1 and Rn_comp2 to be shaped in each case as sections of the n-doped semiconductor layer.

The blocking capacitor Clc is embodied either in a monolithically integrated fashion or, as already mentioned above, as a separate component (e.g. arranged on a submount). In the exemplary embodiment in FIG. 11, both the feed line 7 and the compensation path (i.e. the resistance elements Rn_comp1, Rn_comp2 and the blocking capacitor Clc) are connected to a front section 32 of the n-doped region 3. It would also be conceivable, of course, as already mentioned above, in particular depending on the ratio of the feed line resistance Rn_acc and the contact resistance Rn_in, to arrange the compensation path on a different side of the n-doped region 3.

An etching trench 304 is situated between the sections 301, 302, said etching trench electrically insulating the sections 301, 303, i.e. the feed line 7 and the resistance element Rn_comp1, from one another. A weakly conducting resistive connection between the feed line 7 and the compensation path via the optical waveguides 11, 12 and via the front MMI 400 can be tolerated.

The modulators of the previous exemplary embodiments can also be combined with one another. One example of a modulator arrangement 100 comprising two modulators 110, 120 according to the invention that are combined with one another is illustrated in FIG. 12, wherein the modulator arrangement 100 realizes an IQ modulator. The modulators 110, 120 each have a compensation path (indicated by the rectangles 130, 140 in FIG. 12) having the compensation resistances Rn_compA, Rn_compB and a respective blocking capacitor. It is also conceivable, of course, for only one of the modulators 110, 120 to be embodied according to the invention, i.e. to have a compensation path.

An RF voltage is applied in each case to the modulators 110, 120 in a manner known per se (via voltage sources 4a, 4b), wherein the modulators 110, 120 are operated asymmetrically in each case, that is to say that one of the respective coplanar lines 23a, 24a or 23b, 24b is connected to ground. Analogously to the modulators of the previous exemplary embodiments, the DC voltage is applied respectively via contact pads 61a, 61b to the respective n-doped region 3a, 3b. An isolation trench 150 extends between the modulators 110, 120.

The phase electrodes can be arranged in each case in front of or behind the coplanar lines 23a, 24a, 23b, 24b. By way of example, phase electrodes 701a, 702a, 701b, 702b of the modulators 110, 120 are used behind the coplanar lines 23a, 24a, 23b, 24b for the case Rn_acc=Rn_comp≤Rn_in. This creates space for the compensation path in front of the coplanar lines 23a, 24a, 23b, 24b in order to be able to connect the compensation path in each case to a front section of the n-doped regions 3a, 3b.

The invention thus in particular also enables low-chirp asymmetrical operation of IQ modulators, wherein possible crosstalk effects can additionally be reduced by line feed optimizations outside the actual modulator regions (i.e. outside the respective coplanar lines 23a, 24a, 23b, 24b).

The invention claimed is:

1. An electro-optical modulator, comprising
a first and a second optical waveguide;
at least one first capacitance (C1, C1a-d), via which a voltage can be applied to a light-guiding region of the first optical waveguide;
at least one second capacitance (C2, C2a-d), via which a voltage can be applied to a light-guiding region of the second optical waveguide;

an electrically conductive region, via which the first and second capacitances (C1, C1a-d, C2, C2a-d) are electrically connected to one another; and a feed line to the electrically conductive region, via which feed line a DC voltage can be applied to the electrically conductive region, wherein the feed line is constituted such that it represents an electrical resistance (Rn_acc) connected in parallel with the second capacitance (C2, C2a-d); and a compensation resistance (Rn_comp) connected in parallel with the first capacitance (C1, C1a-d) and serving for reducing transients in a voltage profile on the first and second capacitances (C1, C1a-d, C2, C2a-d) during the operation of the modulator, wherein the compensation resistance (Rn_comp) is dependent on the first capacitance (C1) or, in the case of a plurality of first capacitances (C1a-d), on a first total capacitance C1tot, the resistance (Rn_acc) of the feed line and the second capacitance (C2) or, in the case of a plurality of second capacitances (C2a-d), on a second total capacitance (C2tot), wherein the product Rn_comp·C1 or the product Rn_comp·C1tot lies in the interval (Rn_acc·C2)+−20% or (Rn_acc·C2tot)+−20%.

2. The electro-optical modulator as claimed in claim 1, wherein the product Rn_comp·C1 or the product Rn_comp·C1tot lies in the interval (Rn_acc·C2)+−10% or (Rn_acc·C2tot)+−10% or the product Rn_comp·C1 or Rn comp·C1tot at least substantially corresponds to the product Rn_acc·C2 or Rn_acc·C2tot.

3. The electro-optical modulator as claimed in claim 1, wherein the compensation resistance (Rn_comp) is dependent on the resistance (Rn_acc) of the feed line, wherein the compensation resistance (Rn_comp) lies in the interval Rn_acc+−20% or Rn_acc+−10% or the compensation resistance (Rn_comp) at least substantially corresponds to the resistance (Rn_acc) of the feed line.

4. The electro-optical modulator as claimed in claim 1, wherein the feed line runs between the electrically conductive region and a contact pad that can be connected to a DC voltage source.

5. The electro-optical modulator as claimed in claim 1, wherein the feed line runs between the electrically conductive region and a DC voltage source.

6. The electro-optical modulator as claimed in claim 1, further comprising a first electrode for contacting the first capacitance (C1, C1a-d) and a second electrode for contacting the second capacitance (C2, C2a_d).

7. The electro-optical modulator as claimed in claim 6, wherein the compensation resistance (Rn_comp) is electrically connected firstly to the first electrode and secondly to the electrically conductive region.

8. The electro-optical modulator as claimed in claim 6, wherein the first electrode is a signal electrode and the second electrode is a ground electrode.

9. The electro-optical modulator as claimed in claim 1, wherein the compensation resistance (Rn_comp) is formed by at least two series-connected resistance elements (Rn_comp1, Rn_comp2).

10. The electro-optical modulator as claimed in claim 9, wherein a capacitor (Clc) is arranged in series with the resistance elements (Rn_comp1, Rn_comp2).

11. The electro-optical modulator as claimed in claim 1, wherein the compensation resistance (Rn_comp) and the feed line are connected in each case to a front section as viewed along the direction of propagation of an optical wave coupled into the modulator of the electrically conductive region, or the compensation resistance (Rn_comp) and the feed line are connected in each case to a rear section of the electrically conductive region.

12. The electro-optical modulator as claimed in claim 6, wherein the compensation resistance (Rn_comp) is connected to a front or rear end section—as viewed along the direction of propagation of an optical wave coupled into the modulator of the first electrode.

13. The electro-optical modulator as claimed in claim 6, wherein the feed line to the electrically conductive region extends from a contact pad situated—as viewed along the direction of propagation of an optical wave coupled into the modulator upstream of the first and second electrodes.

14. The electro-optical modulator as claimed in claim 1, wherein the feed line is formed by a partial section of a doped semiconductor layer that is connected to a further partial section of the doped semiconductor layer, said further partial section shaping the electrically conductive region.

15. The electro-optical modulator as claimed in claim 1, wherein the compensation resistance (Rn_comp) is formed by a partial section of a doped semiconductor layer that is connected to a further partial section of the doped semiconductor layer, said further partial section forming the electrically conductive region.

16. The electro-optical modulator as claimed in claim 1, wherein the modulator is a semiconductor component and the compensation resistance (Rn_comp) is monolithically integrated with other components of the modulator.

17. The electro-optical modulator as claimed in claim 9, wherein at least one of the resistance elements (Rn_comp1, Rn_comp2) is monolithically integrated with other components of the modulator.

18. The electro-optical modulator as claimed in claim 10, wherein the capacitor (Clc) is arranged on a separate substrate.

19. The electro-optical modulator as claimed in claim 6, wherein the compensation resistance (Rn_comp) is formed by at least two series-connected resistance elements (Rn_comp1, Rn_comp2), further comprising a terminating resistance (Rterm, Rterm1, Rterm2) connected to the first and second electrodes, said terminating resistance being situated on a different substrate than the first and second electrodes, wherein at least one of the resistance elements (Rn_comp1, Rn_comp2) is concomitantly arranged on the substrate of the terminating resistance (Rterm, Rterm1, Rterm2).

20. A modulator arrangement, comprising at least one first and one second electro-optical modulator, wherein at least one of the two modulators is embodied as claimed in claim 1.

* * * * *